United States Patent [19]

Kanayama et al.

[11] Patent Number: 5,097,167
[45] Date of Patent: Mar. 17, 1992

[54] ROTARY ELECTRIC MACHINE COIL ASSEMBLIES

[75] Inventors: Kenji Kanayama, Kariya; Hidekuni Sugi, Nagoya; Shuzo Kinkori, Okazaki, all of Japan

[73] Assignee: Nippondenso Co., Ltd., Kariya, Japan

[21] Appl. No.: 258,127

[22] Filed: Oct. 13, 1988

Related U.S. Application Data

[63] Continuation of Ser. No. 75,263, Jul. 17, 1987, abandoned, which is a continuation of Ser. No. 844,166, Mar. 26, 1986, abandoned.

[30] Foreign Application Priority Data

Mar. 27, 1985 [JP] Japan .................. 60-62273

[51] Int. Cl.$^5$ .................................... H02K 3/04
[52] U.S. Cl. ........................... 310/201; 310/268
[58] Field of Search ............ 310/42, 43, DIG. 3, 310/266, 268, 201

[56] References Cited

U.S. PATENT DOCUMENTS

| | | | |
|---|---|---|---|
| 1,808,749 | 6/1931 | Apple | 310/201 |
| 2,758,231 | 8/1956 | Welter | 310/268 |
| 2,993,135 | 7/1961 | Henry-Baudot | 310/268 |
| 3,091,715 | 5/1963 | Henry-Baudot | 310/268 |
| 3,109,114 | 10/1963 | Henry-Baudot | 310/268 x |
| 3,159,764 | 12/1964 | Henry-Baudot | 310/268 |
| 3,237,036 | 2/1966 | Konig | |
| 3,290,526 | 12/1966 | Wren et al. | 310/201 X |
| 3,466,483 | 9/1969 | Johnson et al. | 310/268 |
| 4,132,910 | 1/1979 | Kiss et al. | |
| 4,398,112 | 8/1983 | van Gils | 310/201 |
| 4,451,749 | 5/1984 | Kanayama et al. | |
| 4,500,806 | 2/1985 | Kanayama et al. | |

FOREIGN PATENT DOCUMENTS

| | | |
|---|---|---|
| 1131788 | 2/1959 | Fed. Rep. of Germany . |
| 1197174 | 3/1961 | Fed. Rep. of Germany . |
| 1224958 | 6/1960 | France . |

*Primary Examiner*—Mark O. Budd
*Attorney, Agent, or Firm*—Cushman, Darby & Cushman

[57] ABSTRACT

An armature coil assembly for magnet-type rotary electric machines such as alternators or motors, which comprises flat conductor pieces or segments with large-area sides thereof arranged parallel to the direction of the magnetic fluxes of a permanent magnet, and a ferromagnetic member inserted between the conductor pieces. The ferromagnetic member inserted provides a magnetic anisotropy in the armature coil along the axis of coil rotation, thus the flow of magnetic fluxes from the magnet through the armature coil to the machine core is facilitated thereby to reduce leakage magnetic fluxes. A stator coil assembly is also made up by using like coil conductor segments.

8 Claims, 11 Drawing Sheets

ROTARY ELECTRIC MACHINE COIL ASSEMBLIES

This is a continuation of application No. 07/075,263 filed July 17, 1987, abandoned, which was a continuation of application No. 06/844,166 filed Mar. 26, 1986, abandoned.

BACKGROUND OF THE INVENTION

The present invention relates to coil assemblies used for rotary electric machines such as magnet generator or magnet motor.

A conventional armature coil of this type, as disclosed in the specification of U.S. Pat. No. 3,091,715, comprises tabular half-coil conductors each including an inner portion, outer portion inclined radially and radial central portion provided by printed wiring on both sides of an insulating disc. A radial recess or slot is formed in the central portion of the half coil to divide each conductor into two branches, and a tongue of magnetic material is put to fill the recess thereby to increase the effective magnetic fluxes in the gap.

In the above conventional armature coil, when magnetic fluxes pass through the tongue of magnetic material in the axial direction perpendicular to the conductor, an annular eddy current is generated in the conductor on the outer periphery of the magnetic tongue, thereby leading to the disadvantage of the output being reduced by the eddy current loss.

Further, since the conductor is tabular in form and occupies a certain width in peripheral direction when arranged on the insulated disc, it is impossible to increase a number of winding turns, and therefore an output more than a predetermined level cannot be produced.

SUMMARY OF THE INVENTION

It is therefore an object of the present invention to provide an armature coil comprising a multiplicity of flat conductors extending along radial direction and arranged substantially at equal intervals peripherally through gaps, and a plurality of ferromagnetic members inserted between the conductors. The inserted ferromagnetic members provide a magnetic anisotropy in the armature coil in the direction of the rotational axis of the coil, so that the flow of magnetic fluxes from the magnetic poles toward the core of the rotary machine thereby to reduce the leakage magnetic fluxes.

Another object of the present invention is to provide an armature coil using a multiplicity of flat V-shaped conductors prepared by pressing conductor plates.

It is also an object of the present invention to provide a stator coil assembly comprising like conductors arranged along an insulating cylindrical support.

Still another object of the present invention is to provide a flat-type rotary electric machine comprising an armature coil including a multiplicity of flat conductors arranged at substantially equal peripheral intervals through gaps and ferromagnetic members inserted in the gaps, magnetic poles arranged on the axial ends of these conductors, and a core member for passing the magnetic fluxes generated from the magnetic poles across the conductors.

DESCRIPTION OF THE PREFERRED EMBODIMENTS

Figure 1:
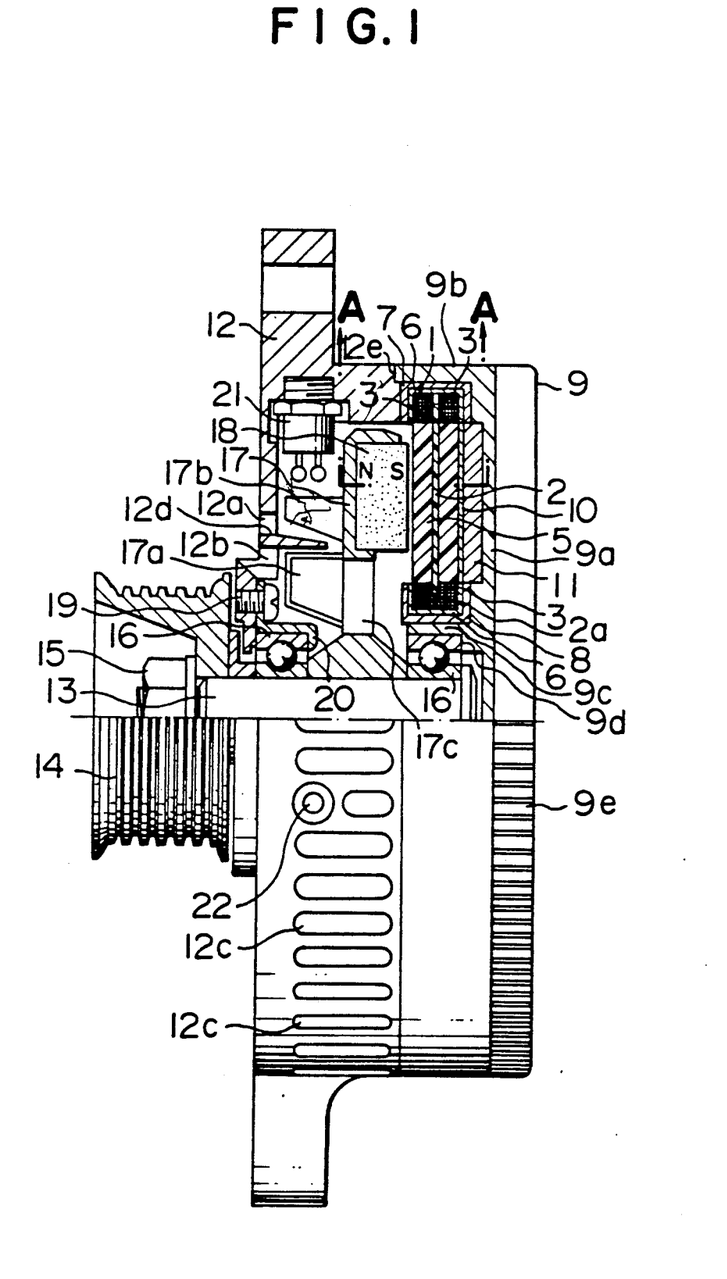
FIG. 1 is a half-sectional front view showing a first embodiment of a flat-type rotary electric machine according to the present invention.
Figure 2:
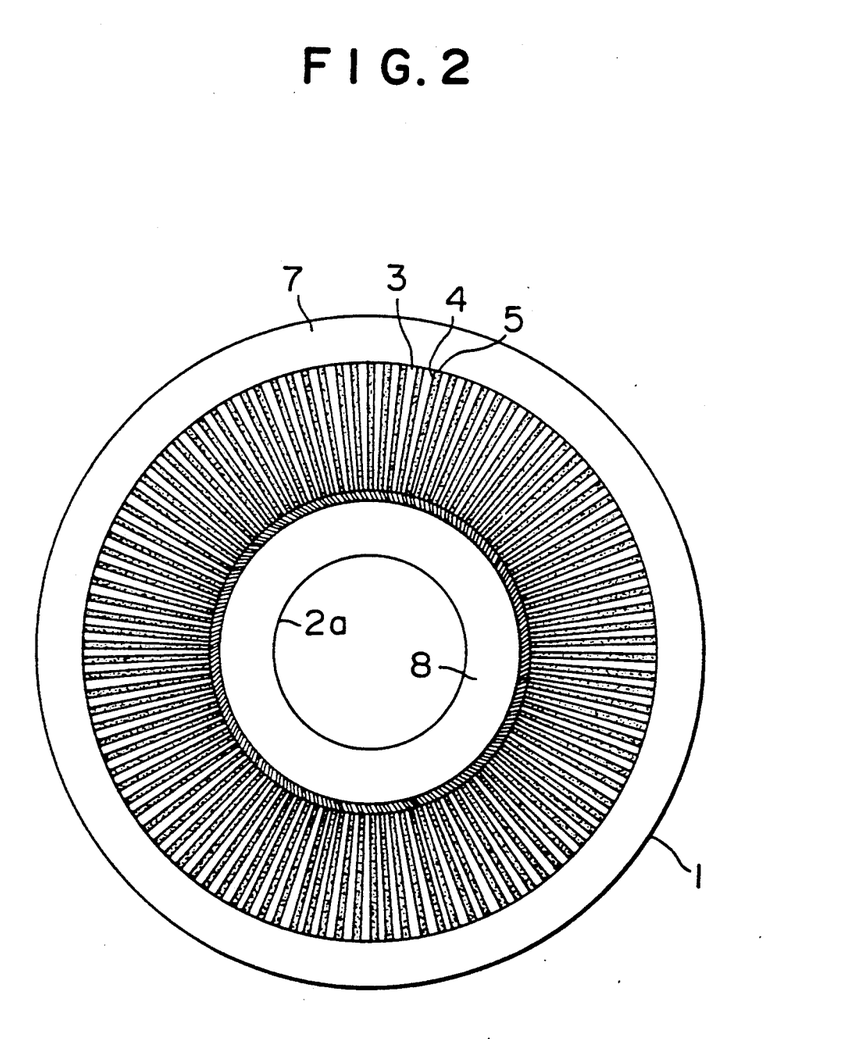
FIG. 2 is a front view of a three-phase AC coil for the rotary electric machine shown in FIG. 1.
Figure 3:
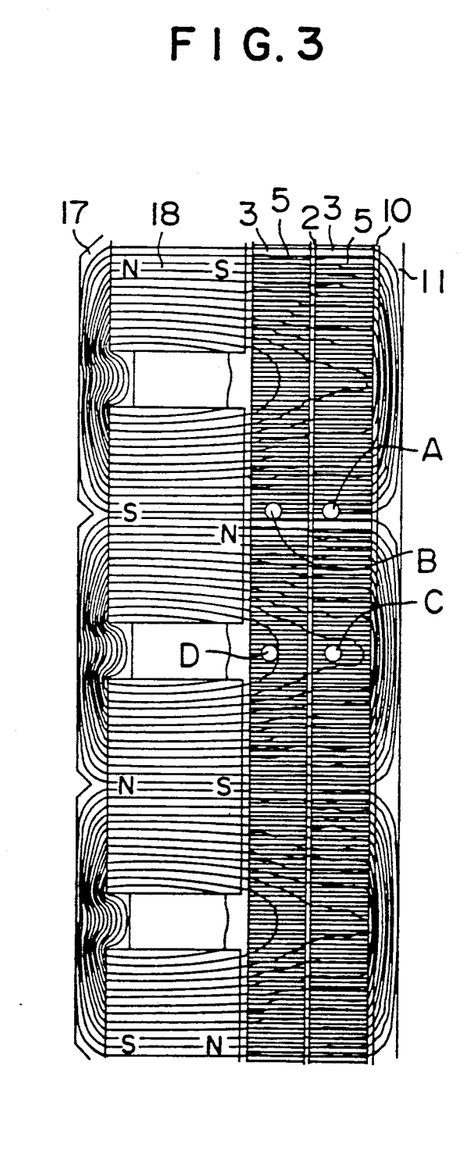
FIG. 3 is a schematic diagram showing a distribution of magnetic fluxes of a permanent magnet in the section along the line A—A in FIG. 1.

In a first embodiment shown in FIGS. 1 to 3, a three-phase AC coil 1 of a magnet generator includes flat coil segment or pieces 3 making up conductors radially extending along the diameter on the front and back side of an annular heat conductive insulating plate 2 having a hollow portion 2a at the central part thereof. A coil piece 3, which is made of a non-magnetic copper plate, is arranged on the insulating plate 2 in such a manner as to have the width thereof along the axial direction. A multiplicity of coil pieces 3 are arranged equidistantly through gaps 4 along the peripheral direction. The outer and inner peripheries of the coil piece 3 are welded on both the front and back thereby to obtain a three-phase AC coil 1 in flat wave-winding form. A method of fabrication of this three-phase AC coil 1 is disclosed in the specification of U.S. Pat. No. 4,500,806.

In the next process, the front and back side gaps 4 on the plate 2 of the three-phase AC coil 1 are filled with an epoxy resin 5 mixed with a ferromagnetic material (such as ferrite, nickel or iron at least 10 in specific magnetic permeability). In this process, the epoxy resin 5 is inserted along the axial direction (by the thickness of the coil piece 3) in the gaps 4. Then heat is applied to thermally set the epoxy resin 5. In this way, the coil pieces 3 are fixed to form the three-phase AC coil 1.

Holders 7 and 8 with a channel or U-shaped section are arranged through a heat conductive insulating sheet 6 on the outer and inner peripheral sides of the three-phase AC coil 1. These holders 7 and 8 are made of a material of high heat conductivity such as aluminum, and insulates a rear housing 9 and the coil pieces of the three-phase AC coil 1 from each other by means of the heat conductive insulating sheet 6.

The rear housing 9 formed of aluminum, on the other hand, includes a flat portion 9a covering the end face of the three-phase coil 1, a first holder section 9b defining the outer periphery of the holder 7 formed on the outer periphery of the flat portion 9a, and a second holder section 9c formed on the inner side of the flat portion 9a for defining the outer periphery of the holder 8. The three-phase AC coil 1 having the holders 7 and 8 mounted thereon is fixed between the first holder section 9b and the second holder section 9c. The inner side of the second holder section 9c is formed with a recess 9d into which a shaft 11 is inserted with a bearing 16 therebetween. Further, the outer periphery of the flat portion 9a is formed with a fin 9e to secure heat radiation.

A flat iron core 11 of magnetic material such as a ferromagnetic iron is arranged with a heat conductive insulating plate 10 between the three-phase AC coil 1 and the flat portion 9a of the rear housing 9.

The front housing 12 is also formed of aluminum, and the three-phase AC coil 1 is securely held between the front housing 12 and the rear housing 9. Two openings including first and second openings 12a and 12b are formed in the axial ends of the front housing 12, and a plurality of exhaust holes 12c are formed on the outer periphery along the diametrical direction. Also, a partition wall 12d is provided between the first and second openings 12a and 12b. The step 12e of the front housing 12 is connected by spigot joint with the first holder section 9b of the rear housing 9, so that the housing 9 and the housing 12 are integrally fixed by a through bolt not shown. A screw 19 is used to secure a bearing 16 with a bracket 20 fixed on the inner side of the front housing 12.

A shaft 13 having a pulley 14 fixed to an end thereof with a bolt 15 is rotatably supported on the front housing 12 and the rear housing 9 through the bearings 16. The outer periphery of this shaft 13 has a rotor 17 fixed thereto, which rotor 17 is adapted to rotate integrally with the shaft 13. The rotor 17 is provided with a permanent magnet 18 forming a field at a position opposite to the iron core 11 through the three-phase AC coil 1 as shown in FIG. 3. This permanent magnet 18 is magnetized in axial direction. A plurality of such permanent magnet 18 have magnetic poles alternating in polarity and arranged along the circumferential direction. The permanent magnet 18 may alternatively be magnetized in the circumferential direction instead of the axial direction. A plurality of coil pieces 3 are arranged over the peripheral width of the permanent magnet 18. A plurality of scoops 17a and fans 17b are formed at positions opposing to the first and second openings 12a and 12b respectively along the periphery on the front housing 12 side of the rotor 17. A hole 17c is provided at the positions of the scoops 17a.

A thyristor 21 is electrically connected to the three-phase AC coil 1 and is securely fitted by screw to the inner periphery of the front housing 12. An output terminal 22 is electrically connected to a thyristor bridge including the thyristor 21 and a diode not shown.

With the rotation of the pulley 14, the rotor 17 rotates with the shaft 13. The rotation of the fans 17b of the rotor 17 causes the air from the first opening 12a to cool the thyristor bridge 21 and to flow out through the exhaust ports 12c. On the other hand, the scoops 17a causes the air from the second opening 12b to cool the three-phase AC coil 1 through the hole 17c and flow out through the exhaust ports 12c in similar manner.

With the rotation of the magnet 18, an AC power is generated in the three-phase AC coil 1, which power is rectified by the thyristor bridge into a predetermined voltage. This voltage is supplied to an external electrical load through the output terminal 22.

FIG. 3 is an enlarged sectional view taken along the line (A)—(A) in FIG. 1, and shows a case in which the magnetic fluxes of the magnet 18 act on the three-phase AC coil 1. The quantity of magnetic fluxes involved is shown in Table 1 below.

TABLE 1

|  | A | B | C | D |
|---|---|---|---|---|
| X (Gauss) | 9900 | 9600 | 900 | 300 |
| Y (Gauss) | 0 | −700 | 0 | −1300 |

In this table character A designates the center of the magnet 18 which corresponds substantially to the center of a coil piece 3 on the back side (the rear housing 9 side) of the insulating plate 2, character B designates the center of the magnet 18 which corresponds substantially to the center of a coil piece 3 of the front side (front housing 12 side) of the insulating plate 12, character C designates the center between the adjacent magnets 18 and corresponds substantially to the center of a coil piece 3 on the back side (rear housing 9 side) of the insulating plate 2, and character D designates the center between the adjacent magnets 18 and corresponds substantially to the center of a coil piece 3 on the front side (front housing 12 side) of the insulating plate 2. Also, character X designates the quantity of magnetic fluxes (in Gauss) flowing from the magnet 18 toward the iron core 11 in parallel, and character Y designates the quantity of magnetic fluxes (in Gauss) flowing in vertical direction (upward) of the iron core 11 from the magnet 18.

Figure 8:
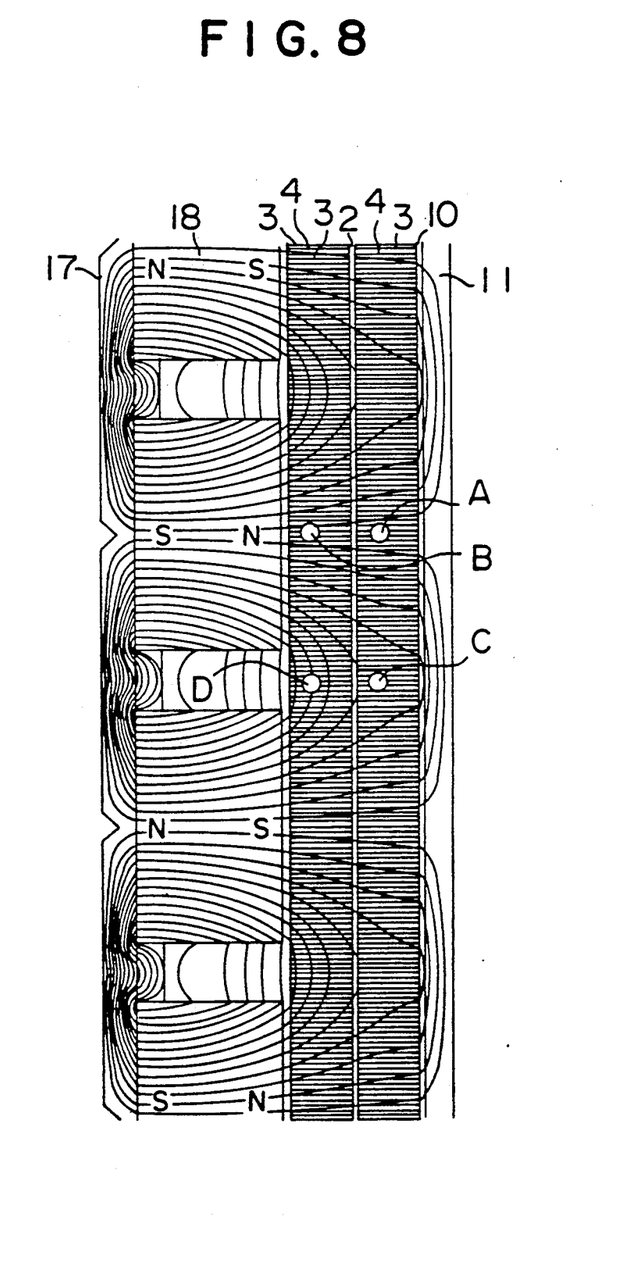
FIG. 8 is a schematic diagram showing a distribution of magnetic fluxes of a permanent magnet of a conventional flat-type rotary electric machine.

FIG. 8 shows a conventional construction in which there is not any ferromagnetic material inserted in the gaps between the coil pieces 3 of the three-phase AC coil 1. Table 2 indicates a distribution of magnetic fluxes of the three-phase AC coil 1 shown in FIG. 8.

TABLE 2

|  | A | B | C | D |
|---|---|---|---|---|
| X (Gauss) | 1900 | 2900 | 100 | 100 |
| Y (Gauss) | 0 | 100 | −500 | −300 |

As will be seen from Tables 1 and 2, measurements show that in the first embodiment, the magnetic fluxes flowing in axial direction through the iron core 11 from the magnets 18 are several times as much as those in the conventional construction.

In other words, with the leakage magnetic fluxes of the magnet 18 reduced, the three-phase AC coil 1 is subjected to an axial magnetic anisotropy, thereby making it possible to apply the magnetic fluxes of the magnet 18 effectively to the iron core 11. In this way, by using the magnet 18 efficiently, the output of the magnet generator is improved with the same volume or geometrical features.

Also, the three-phase AC coil 1 is securely held between the first holder section 91 and the second holder section 9b thereby to prevent the three-phase AC coil 1 from vibrating in high-speed operating range.

Further, the coil piece 3, which is thin in the direction opposed to the magnet 18 and thick in axial direction (in which the magnetic fluxes flow), hardly develops an eddy current. In addition, since a multiplicity of coil pieces may be arranged in peripheral direction, the ampere turn is much increased.

Figure 4:
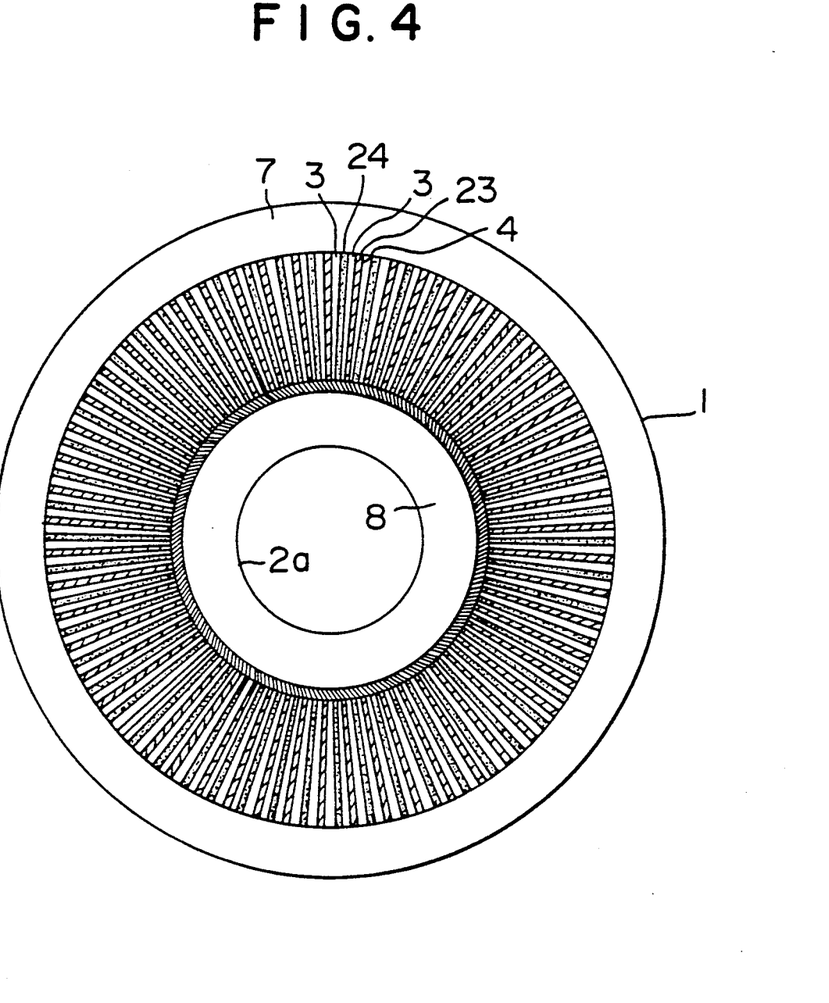
FIG. 4 is a front view showing a three-phase AC coil of a flat-type rotary electric machine according to a second embodiment of the present invention.
Figure 5:
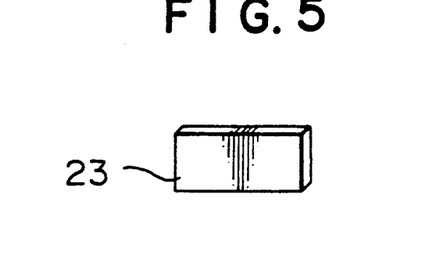
FIG. 5 is a perspective view of an iron plate used with the second embodiment of the present invention.

In the second embodiment of FIG. 4, ferromagnetic members are inserted in alternate gaps 4 between the coil pieces 3. Each of the ferromagnetic members is made of an iron plate 23 with the surface thereof insulation-treated as shown in FIG. 5. As shown in FIG. 5, the iron plates 23 each have flat side surfaces (of which only flat side surface 23a is shown in FIG. 5) and a thickness dimension "t" with the peripheral edge surfaces of the iron plates 23 defined by the thickness dimension "t". This iron plate 23 is inserted in the alternate gaps 4. As shown in FIG. 4, the flat side surfaces of the iron plates 23 are positioned in a side-by-side relationship with their immediately adjacent coil pieces 3. Subsequently, an adhesive 24 is injected into the rest gaps 4 thereby to secure the coil piece 3 and the iron plates 23 in the gaps 4 at the same time.

Figure 6:
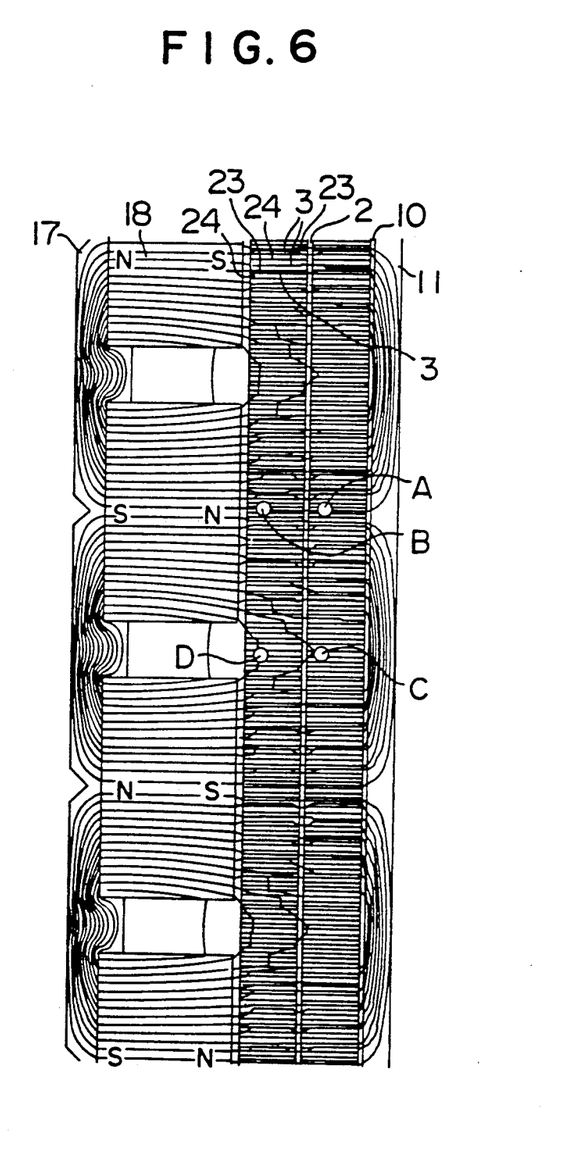
FIG. 6 is a schematic diagram showing a distribution of magnetic fluxes of a permanent magnet according to the second embodiment.

FIG. 6 shows a distribution of magnetic fluxes of the magnet 18, and Table 3 shows the quantity of magnetic fluxes.

TABLE 3

|  | A | B | C | D |
|---|---|---|---|---|
| X (Gauss) | 15500 | 12700 | 1100 | 1200 |
| Y (Gauss) | 0 | −400 | −100 | −400 |

Table 3 indicates that as compared with the case shown in Table 1 related to the first embodiment, the magnetic fluxes flowing in axial direction in the iron core 11 from the magnet 18 are increased, thus making it possible to apply the magnetic fluxes of the magnet 18 more effectively to the iron core 11.

Figure 7:
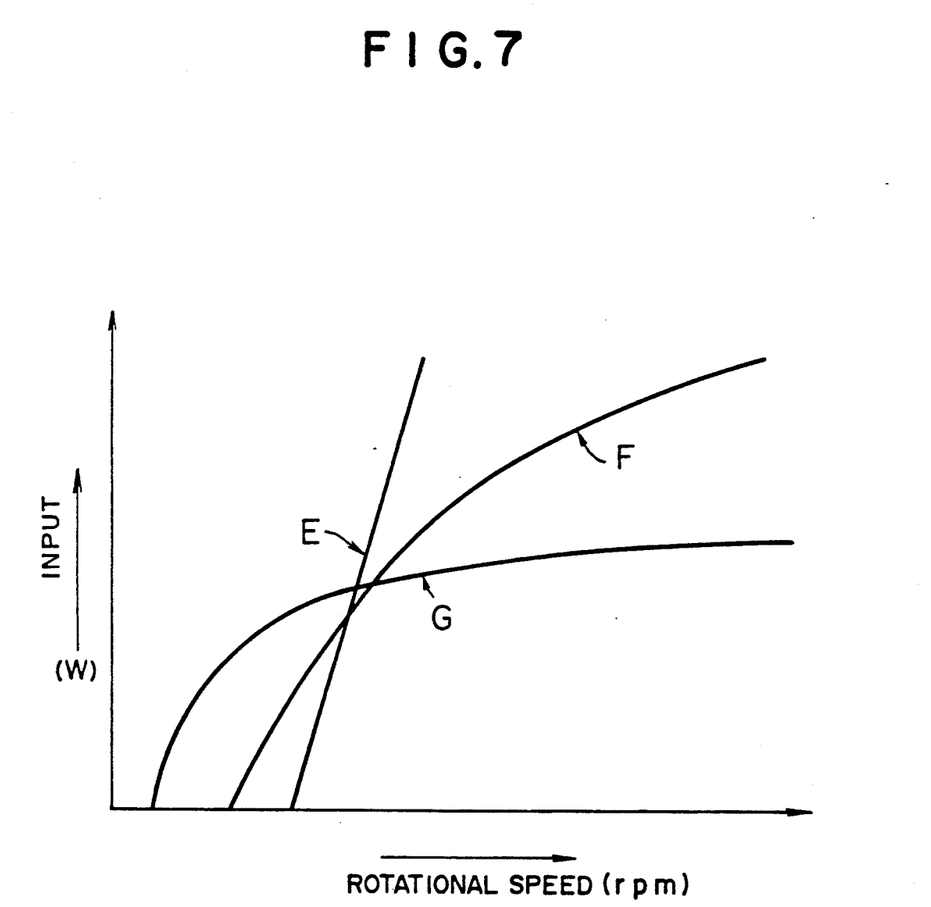
FIG. 7 shows a characteristic of an input against the rotational speed for a flat-type rotary electric machine according to the present invention.

It is also possible to change the input characteristic by changing the inductance of the three-phase AC coil 1 which in turn is changed by changing the specific magnetic permeability of the ferromagnetic member. In the prior art, if the input characteristic is to be changed with the same quantity of magnetic fluxes, the winding specification of the three-phase AC coil 1 is required to be changed. The input characteristic against the speed shown in FIG. 7, in which characters E, F and G designate the characteristic for the specific magnetic permeability ($\mu s$) of 1 (without any ferromagnetic member), 500 and 5000 respectively, however, indicates that with the increase in the specific magnetic permeability of the ferromagnetic member, the input is increased in the low-speed area, and the input is saturated with the increase in the coil impedance in the high speed area.

As will be seen from above, the input characteristic, which is changed by the change in winding specification in the prior art, can be changed merely by changing the specific magnetic permeability of a ferromagnetic member according to the present invention. Instead of the epoxy resin 5 used mixed with the ferromagnetic member in the first embodiment described above, a thermosetting resin, or a silicon-varnish mixture disclosed in the Japanese Patent Publication Laid-Open No. 51-82319 may be employed.

Also, the present invention may be applied, instead of to a three-phase AC coil 1 of a magnet generator, to a DC rotary electric machine with an armature of a printed circuit comprising a multiplicity of tabular conductors arranged on the front and back sides of an insulating plate and their inner and outer peripheries connected as disclosed in the U.S. Pat. No. 3,231,774. Further, as indicated by the U.S. Pat. No. 3,480,815, the present invention may be used with a motor or the like having a disc-like armature with a multiplicity of coils in wave winding.

Furthermore, the permanent magnet 18 may be replaced with equal effect by iron core wound with a coil to generate a magnetic a field. In addition, a permanent magnet may be used in place of the iron core 11 making up a magnetic member.

Figure 9:
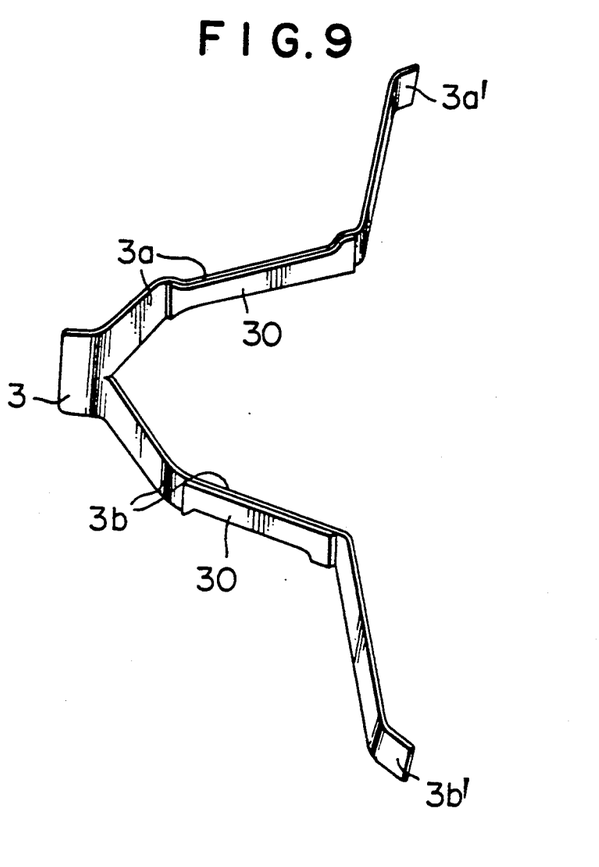
FIGS. 9 to 11 are schematic diagrams showing an armature conductor according to a third embodiment of the present invention.
Figure 10:
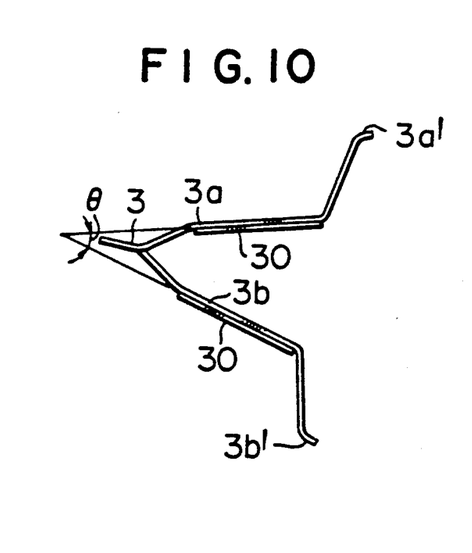
Figure 11:
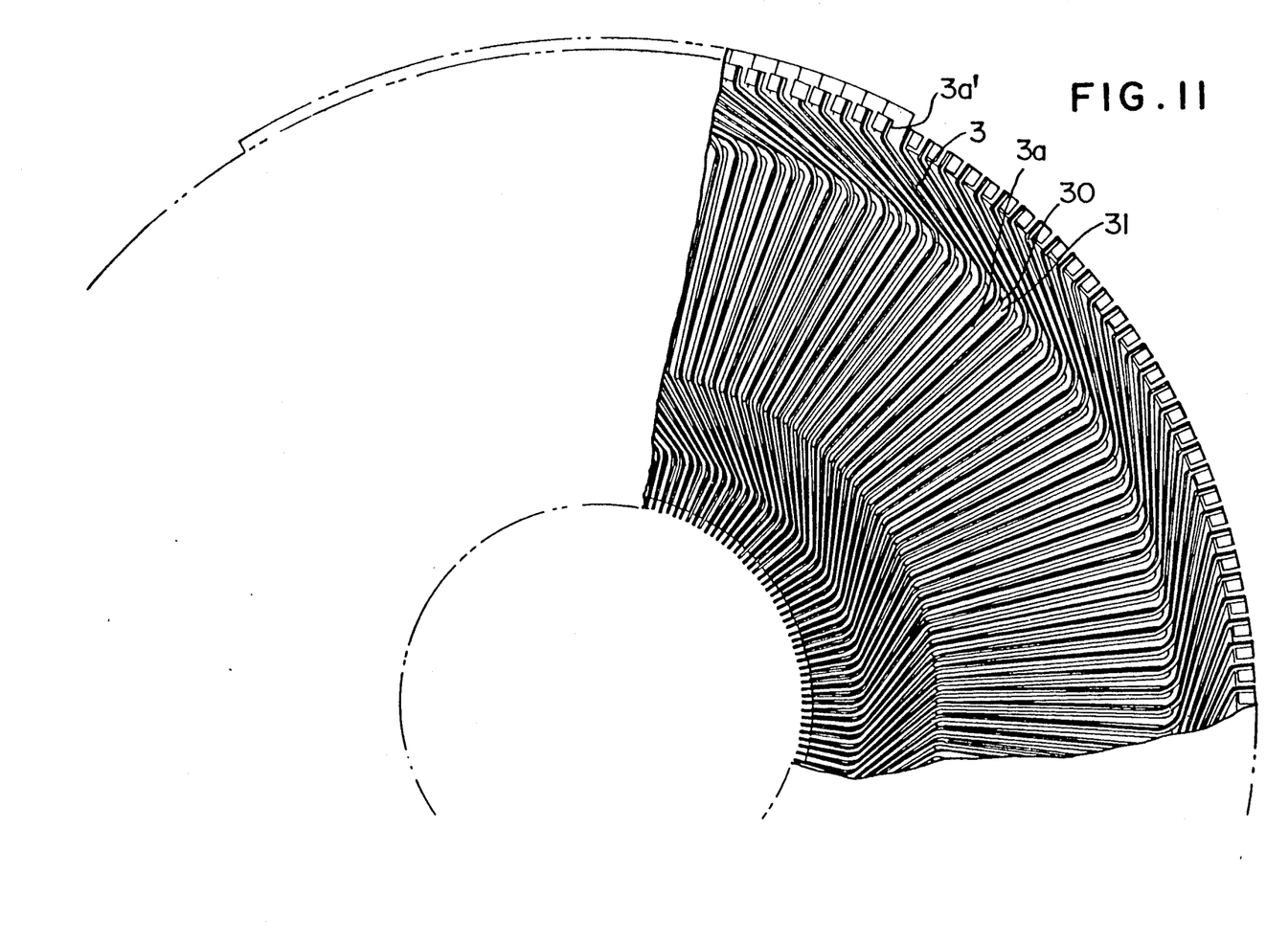

A third embodiment is shown in FIGS. 9 to 11, FIG. 9 illustrating a perspective view of a coil piece 3, and FIG. 10 a front view of the coil piece 3. This coil piece 3 is formed of a single plate subjected to press work, in which an upper arm 3a and a lower arm 3b are formed branching out from the center to define a V shape. A predetermined gap is formed in the pressing work so as to accommodate the insulating plate 2 between the upper arm 3a and the lower arm 3b.

A couple of iron plates 30 having a substantially equal thickness along the periphery and axis are welded or otherwise connected in the parallel peripheral direction at the parts of the upper arm 3a and the lower arm 3b which are opposed to the magnet 18. As shown in FIGS. 9 and 10, the iron plates 30 each have flat side surfaces (of which only flat side surface 30a is shown in FIG. 9) and a thickness dimension "t" (best seen in FIG. 10) with the peripheral edge surfaces of the iron plates 30 defined by the thickness dimension "t". The flat side surfaces of the iron plates 30 are positioned in a side-by-side relationship with their respective arms 3a or 3b of their coil piece 3.

As shown in FIG. 10, the opening angle $\theta$ of the upper arm 3a and the lower arm 3b connected with the iron plates 30 is set in accordance with the number of poles of the magnet 18. Specifically, if the number of poles are six (the number of N and S poles of the magnet 18 is 12 along the periphery), it is set to $\theta = 360/12 = 30$ degrees.

Further, the parts of the upper arm 3a and the lower arm 3b opposing to the magnet 18 are smaller in axial thickness than the ends thereby to reduce the resistance thereat.

The center of the coil piece 3 is inserted from the central hole 2a side of the insulating plate 2, and the insulating plate 2 is inserted between the upper arm 3a and the lower arm 3b. In the process, the upper arm 3a of another coil piece 3 is disposed on the lower arm 3b of the first-inserted coil piece 3 by way of the insulating plate 2.

The peripheral end portions 3a' and 3b' of the upper arm 3a and the lower arm 3b of the coil piece are welded to different coil pieces 3 respectively at the outer periphery of the insulating plate 2 thereby to wind the coil pieces 3 in wave form.

As shown in FIG. 11, resin 31 or the like is inserted securely in the gap between different upper arms 3a. In other words, since the iron plate 30 is connected to the parts of the upper arm 3a and the lower arm 3b opposing to the magnet 18, the coil piece 3 and plate 30 are connected in parallel to each other. Thus, assuming exemplarily the use of iron and copper of the same sectional areas as the respective conductors, then the iron ($9.80 \times 10^{-8}$ ohm.m in resistivity) and copper ($1.72 \times 10^{-8}$ ohm.m in resistivity) are connected in parallel, so that the whole resistivity is reduced to $1.46 \times 10^{-8}$ ohm.m, with the result that a more current flows than in the case of construction of using copper alone. The current flowing in the coil piece 3 is thus increased thereby to improve the output even more.

In this way, the plate 30 is used to apply the magnetic fluxes of the magnet 18 effectively on the one hand and used as a current path on the other hand.

Figure 12:
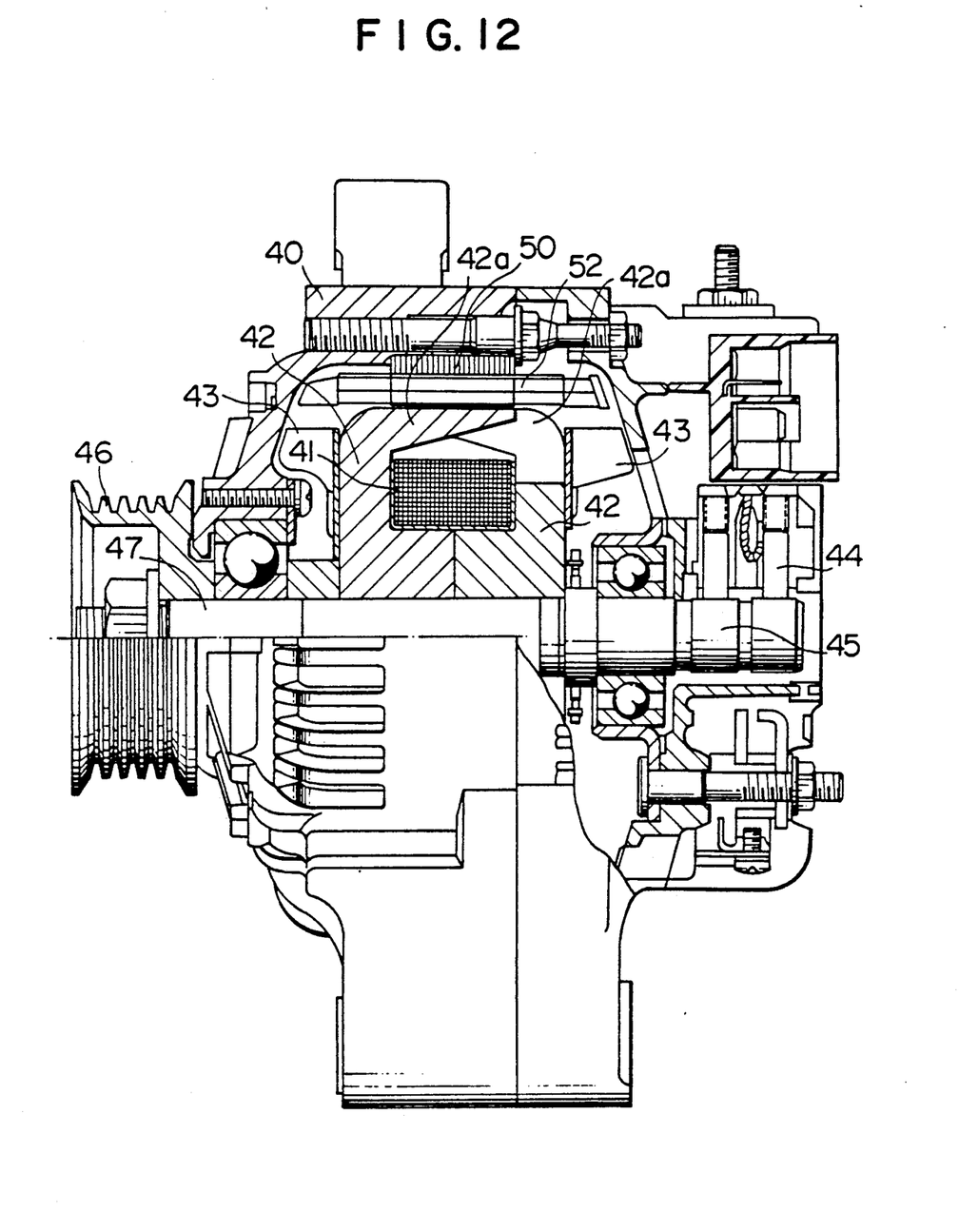
FIGS. 12 to 14 are schematic diagrams showing an AC generator for vehicles and a stator thereof according to a fourth embodiment of the present invention.
Figure 13:
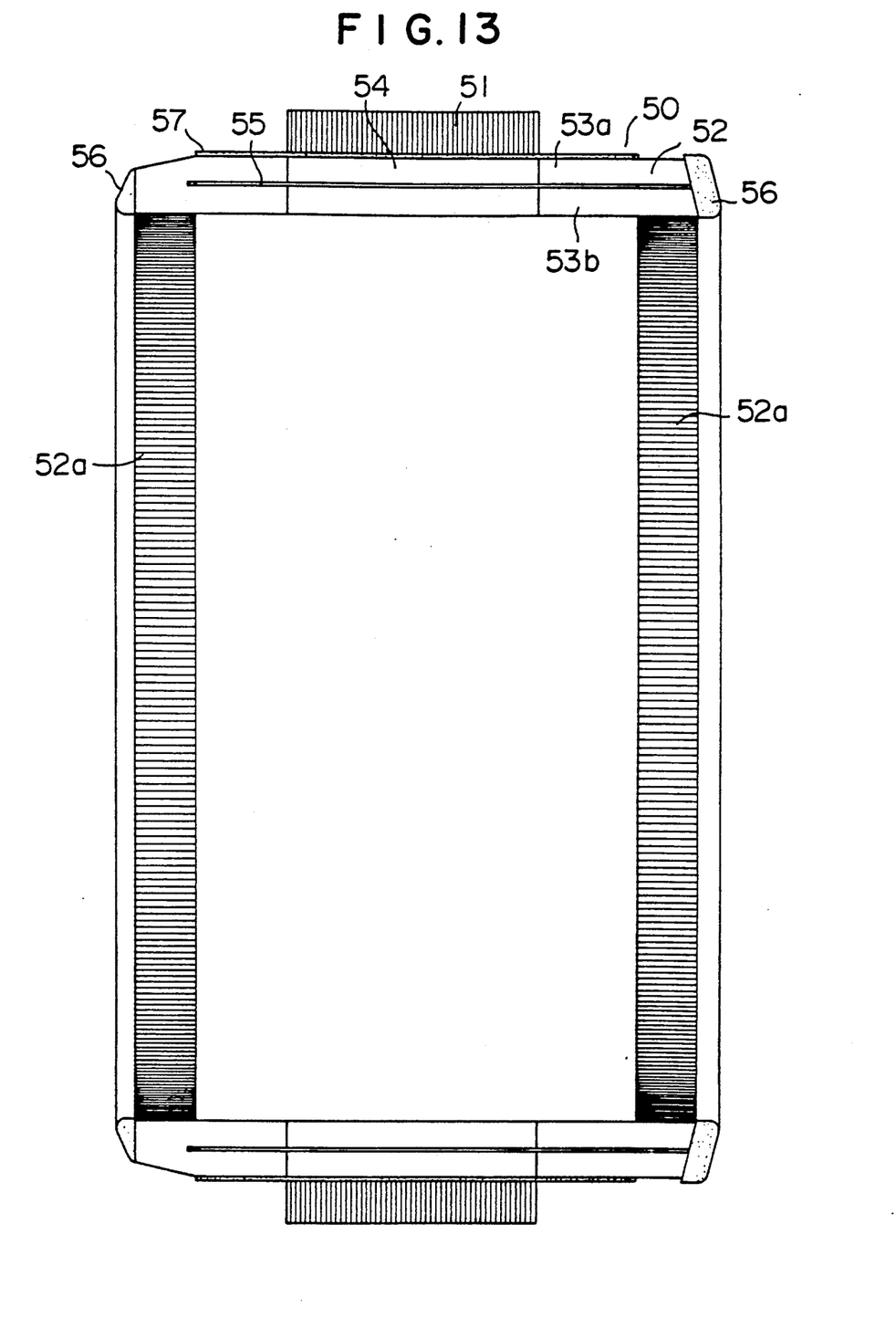
Figure 14:
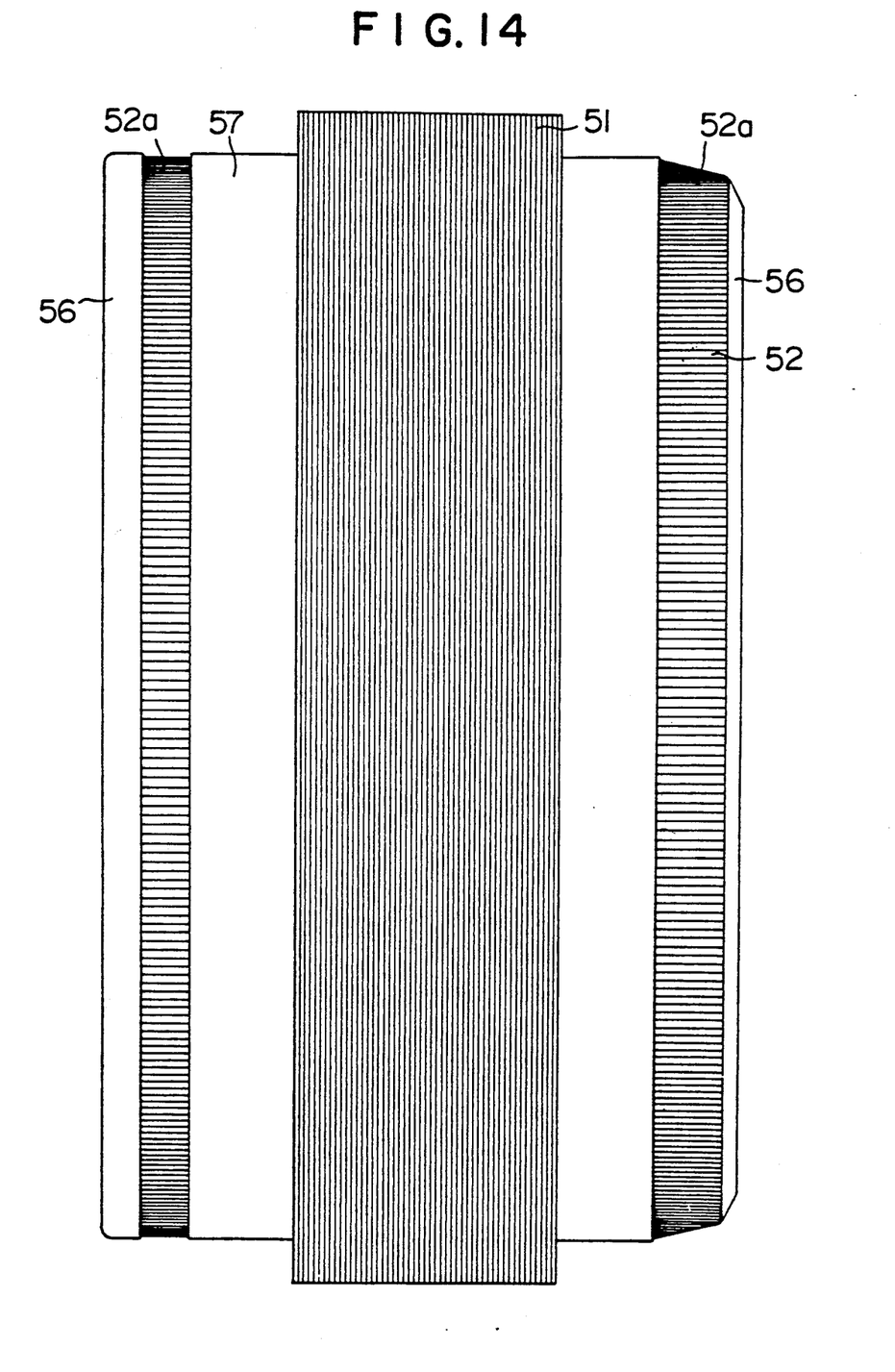

A fourth embodiment is shown in FIGS. 12 to 14, FIG. 12 illustrating a front sectional view of the essential parts of an AC generator for vehicles. The essential parts are configured in the same way as those disclosed in the specifications of the U.S. Pat. Nos. 4,418,295 and 4,419,597.

FIGS. 13 and 14 show a stator. This stator 50 is mounted on the inner periphery of a front-side frame 40. A couple of pole cores 42 wound with a rotor coil 41 are arranged rotatably on the inner periphery of the stator 50.

The stator 50 includes a stator core 51 and a stator coil 52 wound on the stator core 51.

Figure 15:
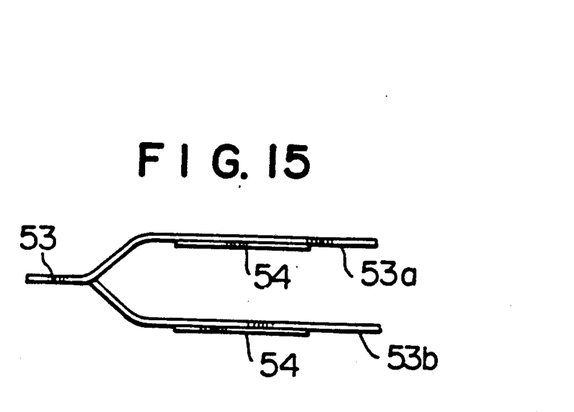
FIG. 15 shows a coil conductor segment used for a stator coil assembly of the fourth embodiment.

The stator coil 52, as shown in FIG. 15, comprises coil conductor segments each having an upper arm 53a and a lower arm 53b branched out from the center of each segment 53 made of a single copper plate. The upper arm 53a and the lower arm 53b are arranged in parallel to each other, to each end surface of which is welded an iron plate 54 of the same length as the axial length of the stator core 51 (the axial length of the rotor coil 41).

A cylindrical insulating plate support 55 is inserted between the upper arm 53a and the lower arm 53b, and in the case of three-phase AC a plurality of another upper arms 53a or lower arms 53b are arranged in a multiple of three between the upper arm 53a and the lower arm 53b of one coil segment 53. Also, the ends of different upper arms 53a and lower arms 53b are welded in wave winding outside of the end of the insulating plate support 55, and the three-phase stator coil 52 is formed cylindrically in such a manner as to arrange a multiplicity of coil segment 53 along the peripheral direction.

The coil segments 53 of the stator coil 52 are arranged in such a way that the thickness of the coil segments 53 lies along the radial direction.

The stator coil 52, on the other hand, is provided with a first resin member 57 in spaced relations from the ends at the central part thereof and a second resin member 56 at the ends thereof to prevent the coil segments 53 from coming into contact with each other. Also, an insulating member is inserted between the stator core 51 and the stator coil 52.

Further, a coil segment 53 is exposed between the first resin 57 and the second resin 56, and the exposed portion 52a is disposed at a position opposed to the diametrical periphery of a couple of fans 43 fixed on the ends of the pole core 42. The air from the fans 43 cools the exposed portion 52a acting as fin thereby to cool the whole of the stator coil 52 more effectively.

The operation of the above-mentioned AC generator for vehicles will be explained. A current is supplied through a brush 44 and a slip ring 45 to a rotor coil 41 thereby to induce magnetic poles N and S in a lug 42a of the pole core 42. Also, the rotary force of the internal combustion engine is transmitted through a pulley 46 to the pole core 42 from a shaft 47. With the rotation of the pole core 42, an AC current is induced in the stator coil 52. This AC current is rectified by a rectifier, and the output voltage is controlled by a regulator.

We claim:

1. A cylindrically-shaped coil assembly for rotary electrical machines, comprising:

a plurality of U-shaped coil conductors, each conductor having first and second spaced legs having respective flat side surfaces with the flat sides of each leg aligned in a radial direction relative to the axis of said assembly;

electrically-conductive and ferromagnetic plates electrically connected to respective ones of the flat side surfaces of said coil conductors through direct surface-to-surface contact and through a strong mechanical coupling therebetween to thereby reduce copper loss of the coil and enhance the heat radiation capability of the coil; and insulating material between said coil conductors connected to said ferromagnetic plates to fix said coil conductors in place.

2. An armature coil assembly for rotary electrical machines, comprising:

flat coil conductors fabricated from copper and having first surfaces radially elongated and circumferentially disposed to interlink an incoming magnetic flux; and electrically conductive and ferromagnetic plate fabricated from iron and having a flat surface being in electrical contact and in strong mechanical coupling with the flat surface of said flat coil conductors and disposed to interlink said incoming magnetic flux, thereby concentrating said magnetic flux on said plate, reducing eddy currents generated in said coil conductors, and lowering the eddy current loss of the copper and iron of said flat coil conductors and of said electrically conductive and ferromagnetic plates, respectively.

3. An armature coil assembly according to claim 2, wherein said plate is an iron plate thereby lowering he combined resistance of said conductor and said iron plate in electrical contact therewith relative to the resistance of said conductor.

4. A coil assembly for rotary electrical machines, comprising:

a plurality of U-shaped coil conductors, each conductor having first and second spaced legs having respective flat side surfaces with the flat sides of each leg aligned in a radial direction relative to the axis of said assembly;

electrically-conductive and ferromagnetic plates mechanically secured and electrically connected to respective ones of the flat side surfaces of said coil legs through direct surface-to-surface contact to reduce variations in torque, lower vibration, reduce conduction losses, and enhance the heat radiation capability of the coil conductors; and insulating material between said coil conductors connected to said ferromagnetic plates to fix said coil conductors in place.

5. A cylindrically-shaped coil assembly for rotary electrical machines, comprising:

a plurality of N U-shaped coil conductors, each conductor having first and second spaced legs to provide M legs having respective flat side surfaces with the flat sides of each of said M legs aligned in a radial direction relative to the axis of said assembly, said N coil conductors distributed circumferentially about the axis;

at least one electrically-conductive and ferromagnetic plate electrically connected to respective ones of the flat side surfaces of said M legs through direct surface-to-surface contact and mechanically affixed thereto to thereby reduce copper loss of said coil conductors and enhance the heat radiation capability of said coil conductors; and insulating material between said coil conductors connected to said ferromagnetic plates to fix said coil conductors in place.

6. A cylindrically-shaped coil assembly formed about a central, longitudinally extending axis for rotary electrical machines, comprising:

a plurality of N U-shaped coil conductors, each conductor having first and second spaced legs $N_1$ and $N_2$ having respective flat side surfaces with each leg $N_1$ and $N_2$ aligned parallel to the longitudinal axis of the coil assembly and with the flat side surfaces thereof aligned in a common radial plane that is normal to a plane transverse to the axis of the coil assembly, said N coil conductors distributed circumferentially about the axis to define said cylindrically shaped coil assembly;

an electrically-conductive and ferromagnetic plate mechanically affixed and electrically connected to one of the flat side surfaces of said legs $N_1$ and $N_2$ through direct surface-to-surface contact, said electrically-conductive and ferromagnetic plates functioning to reduce the conduction losses of said coil conductors, reduce vibration, and enhance the heat radiation capability of the coil conductors; and insulating material between said coil conductors connected to said ferromagnetic plates to fix said coil conductors in place.

7. The cylindrically-shaped coil assembly of claim 6, wherein:

said N coil conductors are circumferentially equispaced about the axis.

8. The cylindrically-shaped coil assembly of claim 7, wherein:

the cross-section area of each of said legs $N_1$ and $N_2$ of said N coil conductors in a plane transverse to the axis are substantially equal along their lengths.

* * * * *